(12) United States Patent
Kitamura (10) Patent No.: US 7,162,197 B2
(45) Date of Patent: Jan. 9, 2007

(54) PICTURE BOOK PRODUCTION SYSTEM, SERVER FOR PRODUCING PICTURE BOOK, AND RECORDING MEDIUM

(75) Inventor: Yoshimasa Kitamura, Hokkaido (JP)

(73) Assignee: Hudson Soft Co., Ltd., Hokkaido (JP)

( * ) Notice: Subject to any disclaimer, the term of this patent is extended or adjusted under 35 U.S.C. 154(b) by 893 days.

(21) Appl. No.: 10/000,033

(22) Filed: Dec. 4, 2001

(65) Prior Publication Data

US 2002/0069225 A1 Jun. 6, 2002

(30) Foreign Application Priority Data

Dec. 4, 2000 (JP) .............................. 2000-368227

(51) Int. Cl.
*G09B 5/04* (2006.01)

(52) U.S. Cl. ....................................... 434/317; 715/500
(58) Field of Classification Search ................. 434/317
See application file for complete search history.

(56) References Cited

U.S. PATENT DOCUMENTS

| 5,325,297 | A |   | 6/1994 | Bird et al. ............. | 364/419.07 |
| 5,805,784 | A | * | 9/1998 | Crawford .................... | 345/473 |
| 6,567,104 | B1 | * | 5/2003 | Andrew et al. ............... | 715/62 |

FOREIGN PATENT DOCUMENTS

| EP | 0 785 006 A2 | 7/1997 |
| JP | 10228548 | 8/1998 |

OTHER PUBLICATIONS

Maniac Mansion for Nintendo Entertainment System (NES). Instruction Manual [online]. Jaleco, 1990 [retrieved on Aug. 11, 2005]. Retrieved from the Internet: <URL: http://members.fortunecity.com/harang/nesmanual.html>.*

Lang, Raymond R. "A Declarative model for Simple Narratives." CS Dept, Xavier University. 1999.*

Gillespie, Thom. "Digital Storytelling and Computer Game Design." Indiana Univ., School of Library and Information Studies. 1997.*

Barry, Barbara A. "Story Beads: a wearable for distribnuted and mobile storytelling." MIT, Sep. 2000.*

Davenport, Glorianna and Lee Morgenroth. "Video Database Design: Convivial Storytelling Tools." IC Technical Report. Apr. 1994.*

(Continued)

*Primary Examiner*—Kathleen Mosser
*Assistant Examiner*—Maria Stoica
(74) *Attorney, Agent, or Firm*—Alfred A. Stadnicki (57) ABSTRACT

The object of the invention is to provide a picture book production system accompanied with a server and a recording medium for creating a picture book, in order to reduce a user's energy and to help create a picture book containing images and sentences which are mutually consistent despite a very small amount of stored data. When a user operates a mobile phone 40 to select three keywords, which are transmitted via a wireless base station 30 and a network 20 to a server 10, where a CPU 11 of the server 10 converts the arrangement of the three keywords, reads sentence data along with image data corresponding to the keywords from a memory 12, and produces three scenarios (picture book constituent parts) by synthesizing the sentence data and the image data, so that the picture book is produced by combining the scenarios.

14 Claims, 7 Drawing Sheets

OTHER PUBLICATIONS

Szilas, Nicolas. "Interactive drama on computer: beyond linear narrative." American Association for Artificial Intelligence. 1999.*

Morgenroth, Lee Hayes. "Homer: A Video Story Generator." MIT, May 1992.*

Turner, Scott. "The creative process: A computer model of storytelling and creativity." Hillsdale, NJ: Lawrence Erlbaum Associates, 1994.*

Cavazza et al. "Interactive Storytelling in Virtual Environments" Building the "Holodeck". Virtual Systems and Multimedia International Conference. Oct. 4-6, 2000.*

SJC. "Accurate Reporting and Credibility." <URL: http://www.sjc.uq.edu.au/interactive/random.html> Jan. 1998. [Retrieved Mar. 6, 2006].*

Smith, T.C. et al.: A Planning Mechanism for Generating Story Text, Literary & Linguistic Computing, 1991, UK, vol. 6, No. 2, pp. 119-126, XP008014208 ISSN: 0268-1145.

Communication/European Search Report/Annex to European Search Report.

* cited by examiner

<Place List>

| Keyword | Related Place | Sub-character | | |
|---|---|---|---|---|
| Walking | Marimba Pond | None | Otama-gel | Oji-gel | Hige-gel |
| | Cymbal Park | None | Puru-gel | Oba-gel | Obatarian-gel |
| | Organ Forest | None | Debu-gel | Boo-gel | Ton-gel |
| | Tam-tam | None | Wan-gel | Bambi-gel | Shika-gel |
| Helping Mom | Angel Castle | None | En-gel | --- | --- |
| | Piccolo Town | None | Mimi-gel | Womba-gel | Koa-gel |
| | Viola Library | None | Kentau-gel | --- | --- |
| Shopping | Piccolo Town | None | Mimi-gel | Womba-gel | Koa-gel |
| Bicycle | Piccolo Town | None | Mimi-gel | Womba-gel | Koa-gel |
| | Marimba Pond | None | Otama-gel | Oji-gel | Hige-gel |
| | Flute River | None | Hamu-gel | Urufu-gel | Tsuchibuta-gel |
| | Cymbal Park | None | Puru-gel | Oba-gel | Obatarian-gel |
| | Organ Forest | None | Debu-gel | Boo-gel | Ton-gel |
| | Tam-tam | None | Wan-gel | Bambi-gel | Shika-gel |
| Picnic | Akapuru Lake | None | Tsuchinoko-gel | Nyoro-gel | Anakon-gel |
| | Drum Mountain | None | Mochi-gel | Ann-gel | Osutoann-gel |
| | Flute River | None | Hamu-gel | Urufu-gel | Tsuchibuta-gel |
| Drive | Akapuru Lake | None | Tsuchinoko-gel | Nyoro-gel | Anakon-gel |
| | Flute River | None | Hamu-gel | Urufu-gel | Tsuchibuta-gel |
| | Harp Beach | None | Kukurukan-gel | --- | --- |
| | Organ Forest | None | Debu-gel | Boo-gel | Ton-gel |
| | Tam-tam | None | Wan-gel | Bambi-gel | Shika-gel |
| | Piano Park | None | Panda-gel | Kogyaru-gel | Madomoa-gel |
| Study | Viola Library | None | Kentau-gel | --- | --- |
| Hiking | Drum Mountain | None | Mochi-gel | Ann-gel | Osutoann-gel |
| | Flute River | None | Hamu-gel | Urufu-gel | Tsuchibuta-gel |
| | Organ Forest | None | Debu-gel | Boo-gel | Ton-gel |
| | Tam-tam | None | Wan-gel | Bambi-gel | Shika-gel |
| Exploration | Organ Forest | None | Debu-gel | Boo-gel | Ton-gel |
| | Drum Mountain | None | Mochi-gel | Ann-gel | Osutoann-gel |
| | Akapuru Lake | None | Tsuchinoko-gel | Nyoro-gel | Anakon-gel |
| Playing in the water | Flute River | None | Hamu-gel | Urufu-gel | Tsuchibuta-gel |
| | Akapuru Lake | None | Tsuchinoko-gel | Nyoro-gel | Anakon-gel |
| Sea bathing | Harp Beach | None | Kukurukan-gel | --- | --- |
| Nap | Marimba Pond | None | Otama-gel | Oji-gel | Hige-gel |
| | Organ Forest | None | Debu-gel | Boo-gel | Ton-gel |
| | Tam-tam | None | Wan-gel | Bambi-gel | Shika-gel |

Fig. 3

<Place List>

| Place Name | Property | Sub-character | | | |
|---|---|---|---|---|---|
| Angel Castle | Castle | None | En-gel | --- | --- |
| Piccolo Town | Town | None | Mimi-gel | Womba-gel | Koa-gel |
| Marimba Pond | Pond | None | Otama-gel | Oji-gel | Hige-gel |
| Akapuru Lake | Lake | None | Tsuchinoko-gel | Nyoro-gel | Anakon-gel |
| Drum Mountain | Mountain | None | Mochi-gel | Ann-gel | Osutoann-gel |
| Flute River | River | None | Hamu-gel | Urufu-gel | Tsuchibuta-gel |
| Harp Beach | Sea | None | Kukurukan-gel | --- | --- |
| Cymbal Park | Park | None | Puru-gel | Oba-gel | Obatarian-gel |
| Organ Forest | Forest | None | Debu-gel | Boo-gel | Ton-gel |
| Piano Park | Amusement Park | None | Panda-gel | Kogyaru-gel | Madomoa-gel |
| Tam-tam Glassland | Glassland | None | Wan-gel | Bambi-gel | Shika-gel |
| Viola Library | Library | None | Kentau-gel | --- | --- |

| Keyword | Place | Sub-character | Encounter Flag | Scenario No. |
|---|---|---|---|---|
| Walking | Marimba Pond | Otama-gel | 0 | 030.txt |
| Helping mom | Angel Castle | En-gel | 0 | 012.txt |
| Playing in the water | Flute River | None | 0 | 067.txt |

Fig. 7B

| Keyword | Place | Sub-character | Encounter Flag | Scenario No. |
|---|---|---|---|---|
| Walking | Tam-tam Glassland | Wan-gel | 1 | 005.txt |
| Helping mom | Piccolo Town | None | 0 | 008.txt |
| Playing in the water | Akapuru Lake | Nyoro-gel | 1 | 049.txt |

PICTURE BOOK PRODUCTION SYSTEM, SERVER FOR PRODUCING PICTURE BOOK, AND RECORDING MEDIUM

FIELD OF THE INVENTION

The present invention relates to a picture book production system, a server for producing a picture book, and a recording medium, particularly to a picture book production system, a server for producing a picture book, and a recording medium, capable of saving the user's work, and of producing a picture book with sentences and pictures matching each other, with a small amount of data to be stored.

BACKGROUND OF THE INVENTION

In the conventional picture book production system, a picture book is produced by producing sentence data and image data corresponding thereto and pasting the image data to the sentence data each time the story changes.

In a picture book production process of the conventional picture book production system, the user is required to produce sentence data and image data each time the story changes. Also, preparing the sentence data and image data requires a huge amount of data to be stored. Also, restricting the amount of the image data often requires use of images not matching sentences, and results in a lack of match of the sentences and the images.

SUMMARY OF THE INVENTION

Accordingly, it is an object of the present invention to provide a picture book production system, a server for producing a picture book, and a recording medium, capable of saving the user's work, and of producing a picture book with sentences and pictures matching each other, with a small amount of data to be stored.

According to the first feature of the invention, a picture book production system comprises a memory means for storing a plurality of sentence data in accordance with behavior of a main character corresponding to a plurality of keywords representing the behavior of the main character in a picture book, the memory means also storing a plurality of image data corresponding to the plurality of sentence data; a selection means for selecting a keyword from the plurality of keywords; and a production means for reading out from the memory means the sentence data and the image data corresponding to the selected keyword as a retrieval key, and synthesizing the read-out sentence data and the read-out image data to produce the picture book.

In the foregoing configuration, the picture book can be produced by combining the plurality of sentence data and the plurality of image data stored beforehand in the memory means, so that it can save the user's work, and restrict the amount of the data to be stored. The image data are matched with the sentence data and stored in the memory means so that the picture book can be produced with sentences and pictures matching each other.

According to the second feature of the invention, a picture book production system comprises a memory means for storing a plurality of sentence data in accordance with behavior of a main character corresponding to a plurality of keywords representing the behavior of the main character in a picture book, the memory means also storing a plurality of image data corresponding to the plurality of sentence data; a selection means for selecting a plurality of keywords from the aforementioned plurality of keywords; and a production means for rearranging the selected plurality of keywords, reading out from the memory means the plurality of sentence data and the plurality of image data corresponding to the selected plurality of keywords as retrieval keys, synthesizing the read-out plurality of sentence data and the read-out plurality of image data to produce a plurality of picture book constituent parts, and combining the plurality of picture book constituent parts in an order of the rearranged plurality of keywords to produce the picture book.

In the foregoing configuration, the picture book comprising the plurality of picture book constituent parts corresponding to the selected plurality of keywords can be produced.

According to the third feature of the invention, a picture book production system comprises a memory means for storing a plurality of sentence data in accordance with behavior of a plurality of main characters corresponding to the plurality of main characters in a picture book and to a plurality of keywords representing the behavior of the main characters, the memory means also storing a plurality of image data corresponding to the plurality of sentence data; a selection means for selecting a main character and a plurality of keywords from the plurality of main characters and the aforementioned plurality of keywords; and a production means for rearranging the selected plurality of keywords, reading out from the memory means the plurality of sentence data and the plurality of image data corresponding to the one main character and the plurality of keywords as retrieval keys, synthesizing the read-out plurality of sentence data and the read-out plurality of image data to produce a plurality of picture book constituent parts, and combining the plurality of picture book constituent parts in an order of the rearranged plurality of keywords to produce the picture book.

In the foregoing configuration, the picture book matched with the main character can be produced.

According to the fourth feature of the invention, a picture book production system comprises a memory means for storing a plurality of locations for movement of a main character and a plurality of sub-characters appearing therein corresponding to a plurality of keywords representing behavior of the main character in a picture book, the memory means also storing a plurality of sentence data in accordance with the behavior corresponding to the keywords, locations, and sub-characters, the memory means also storing a plurality of image data corresponding to the plurality of sentence data; a selection means for selecting a keyword from the plurality of keywords; and a production means for optionally determining the locations and sub-characters on the basis of the selected keyword, reading out from the memory means the sentence data and the image data corresponding to the selected keyword, the determined locations and sub-characters as retrieval keys, and synthesizing the read-out sentence data and the read-out image data to produce the picture book.

In the foregoing configuration, the picture book with the main character and sub-characters appearing therein can be produced.

According to the fifth feature of the invention, a picture book production system comprises a memory means for storing a plurality of sentence data in accordance with behavior of a main character corresponding to a plurality of keywords representing the behavior of the main character in a picture book, the memory means also storing a plurality of image data corresponding to the plurality of sentence data; a selection means for selecting a keyword from the plurality of keywords; a production means for reading out from the memory means the sentence data and the image data corresponding to the selected keyword as a retrieval key, and synthesizing the read-out sentence data and the read-out image data to produce the picture book; and a display means for displaying the picture book.

In the foregoing configuration, the picture book can be produced by the production means only by selecting the keyword by the selection means, and the picture book is displayed on the display means.

According to the sixth feature of the invention, a server for producing a picture book in accordance with information from a terminal connected via a network comprises a memory means for storing a plurality of sentence data in accordance with behavior of a main character corresponding to a plurality of keywords representing the behavior of the main character in the picture book, the memory means also storing a plurality of image data corresponding to the plurality of sentence data; and a production means for reading out from the memory means the sentence data and the image data corresponding to the keyword selected as a retrieval key from the plurality of keywords by the terminal, and synthesizing the read-out sentence data and the read-out image data to produce the picture book.

In the foregoing configuration, the picture book can be produced at the server only by selecting the keyword at the terminal.

According to the seventh feature of the invention, a recording medium for recording comprising a plurality of sentence data corresponding to a plurality of keywords representing behavior of a main character in a picture book, a plurality of image data corresponding to the plurality of sentence data, and a computer operating program for reading out, from the plurality of sentence data and from the plurality of image data, the sentence data and the image data corresponding to the keyword selected as a retrieval key from the plurality of keywords, and synthesizing the read-out sentence data and the read-out image data to produce the picture book.

BRIEF DESCRIPTION OF THE DRAWINGS

FIG. 2 is a chart showing a memory content in a memory of a server according to the preferred embodiment of the invention;

PREFERRED EMBODIMENT OF THE INVENTION

Next, a picture book production system in a preferred embodiment according to the invention will be described in conjunction with the appended drawings.

Figure 1:
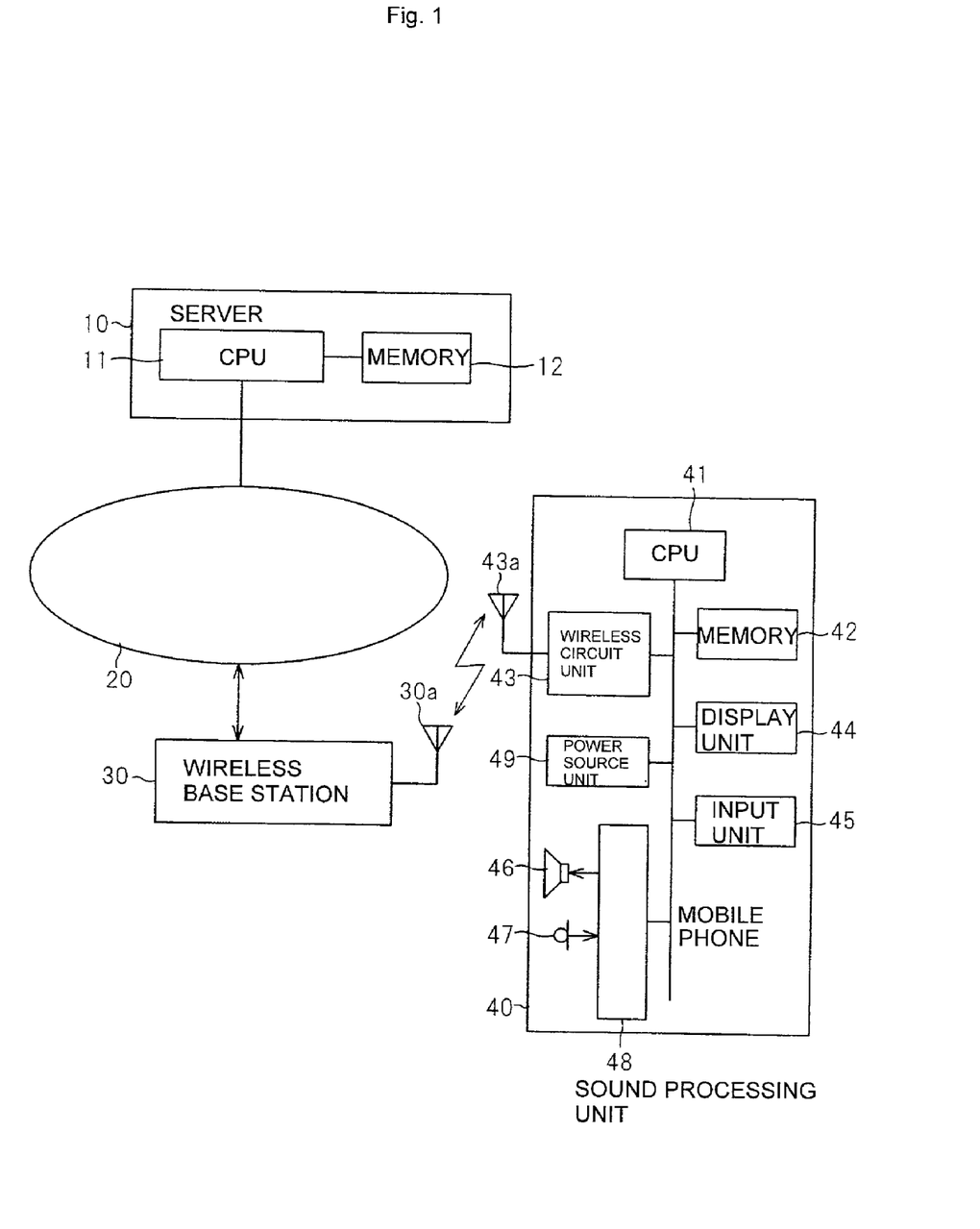
FIG. 1 is a block diagram showing a picture book production system according to a preferred embodiment of the invention.

FIG. 1 shows a picture book production system according to the preferred embodiment of the invention. The picture book production system comprises a server 10 connected to a mobile phone 40 via a network such as the Internet and a wireless base station 30.

The server 10 comprises a CPU 11 for exchanging communications with a mobile phone via the wireless base station 30, along with a memory 12 comprising a program storage area for storing operating program for the CPU 11 and a data storage area for storing data, which is indispensable in a picture book production.

A program storage area of the memory 12 stores operating programs of the CPU 11, which includes a browsing software which permits browsing the picture such as a Web browser, a picture book production software for producing a picture book, and a communications software for sending a notification by an E-mail. A data storage area of the memory 12 stores map data including plurality of locations where a main character's behaviors as a leading role in the picture book take place, plurality of sentence data, plurality of image data corresponding to the plurality of sentence data, contents of which contains map data along with characters, sentence data retrieval keys for retrieving sentence data, and plurality of basic connecting sentences for connecting between sentence data.

The sentence data retrieval keys include, for instance, plurality of main characters such as "Kyatto" and "Panda" provided with different personalities, plurality of keywords indicating the main characters' behaviors such as "Walking" and "Helping Mom," plurality of sub-characters such as "Otama-gel" and "Oji-gel" having different personalities, plurality of locations such as "a pond" or "a park" where the main characters and the sub-characters appear, and encounter flags indicating the number of times the main characters and the sub-characters encounter.

Figure 3:
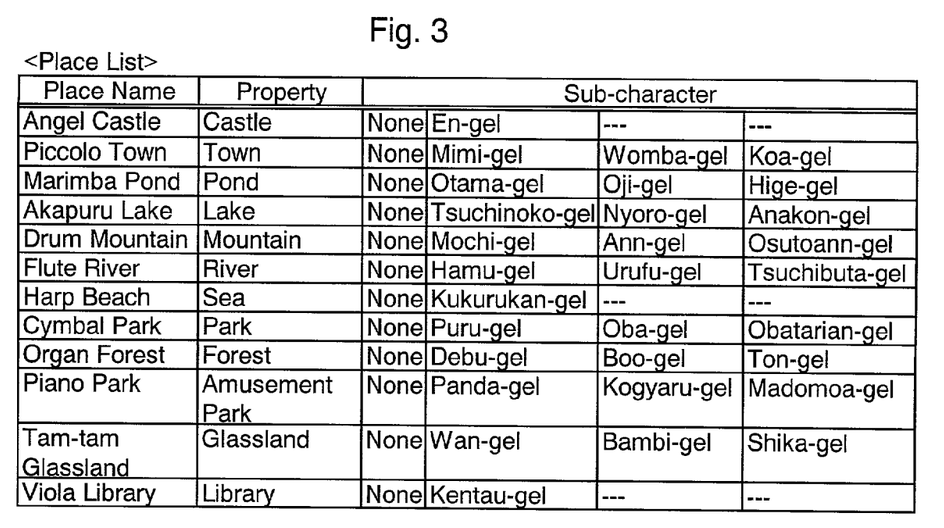
FIG. 3 is a chart showing a memory content in a memory of a server according to the preferred embodiment of the invention.

FIG. 2 shows data to be stored in data storage area, and FIG. 3 is a chart explaining an example of the stored data. The data storage area of a memory 12 stores one or more locations for each keyword, and further stores plurality of sub-characters or no sub-character for each location as shown in FIG. 2. The locations are pre-assigned for sub-characters corresponding to place names as shown in FIG. 3, which are accompanied with the plurality of sub-characters for each location as shown in FIG. 2. Moreover, encounter flags are added to sub-characters to indicate the number of times the main character and the sub-characters encounter. In addition, a plurality of sentence data are stored in the data storage area in the memory 12 so that sentence data can be retrieved from sentence data retrieval keys of the main character, the keywords, the locations, the sub-characters and the encounter flags. Meanwhile, the sentence data are produced to reflect personalities of the main character and the sub-characters.

After the CPU 11 of the server 10 selects a single location randomly for three keywords selected by a user, selects a single sub-character randomly for each location and retrieves sentence data from the memory 12 using sentence data retrieval keys of locations and sub-characters which are randomly selected by the CPU 11, the CPU 11 reads out image data corresponding to each of the sentence data from the memory 12, synthesizes the image data and the sentence data and combines the scenarios as three picture book constituent, to produce a picture book. Moreover, the CPU 11 of the server 10 modifies the sentence data or inserts a connecting sentence between the different sentence data in accordance with the sentence data retrieval keys, so as to vary a story according to the situation.

Modification of sentence data is explained hereinafter. The CPU 11 of the server 10 modifies read-out sentence data from the memory 12 using a sentence data retrieval key such as encounter flags. For instance, when locations and sub-characters are selected randomly, the same sub-character may appear in different locations. The sentence data is modified to accord with the situation. As an illustration of this case, a greeting sentence "Hello!" is used on the first encounter with a sub-character, whereas another greeting sentence "Good to see you again!" is used instead on the second encounter with the sub-character. Meanwhile, as many sentence data as needed for the situation can be stored in the memory 12 so that the sentence data do not have to be modified.

Next, insertion of a connecting sentence between different sentence data is explained. When the respective scenarios are combined, the CPU 11 of the server 10 inserts a connecting sentence between different sentence data so as to make sentences flow naturally. The connecting sentence may be inserted at the end of the preceding sentence data, may be inserted at the beginning of the following sentence data, or may not be inserted at either point. Moreover, connecting sentences are selected from a plurality of basic connecting sentences and are modified using sentence data retrieval keys. There are two types of basic connecting sentences depending on one with or without a location change. An example of a connecting sentence with a location change is explained with "Tekuteku-kun " serving as a main character, with "Shopping " and "Piccolo Town " as a first keyword and a location thereof, and with "Playing in the Water " and "Chapuchapu Pond " as a second keyword and a location thereof. For instance, once a basic connecting sentence such as "After . . . at . . . , then . . . " with positions represented as ". . . " left blank is selected, a connecting sentence such as "After Walking at Chapuchapu Pond, then Playing in the Water. " is produced by inserting words into blank spaces represented as ". . . " in the basic connecting sentence, using sentence data retrieval keys in terms of a main character, keywords, locations and the like. Meanwhile, as many connecting sentences as needed in the situation can be stored in the memory 12 so that basic connecting sentences do not have to be modified.

A mobile phone 40 comprises a CPU 41, a memory 42 for storing operating programs and data of the CPU 41, a wireless circuit unit 43 for exchanging data wirelessly between an antenna 43 thereof and an antenna 30a of a wireless base station 30, a display unit 44 such as a liquid crystal display, an input unit 45 which comprises a ten key keypad and various buttons, a speech processing unit 48 for outputting a speech from a loudspeaker 46 and for converting simultaneously a user's voice to be input from a microphone 47 into a sound signal, and a power source unit 49 with a battery for supplying electricity to each part of the mobile phone 40 under control of the CPU 41.

Next, operation of the system is explained referring to drawings. The system operates both in a picture book production mode and in a picture book browsing mode.

Figure 4:
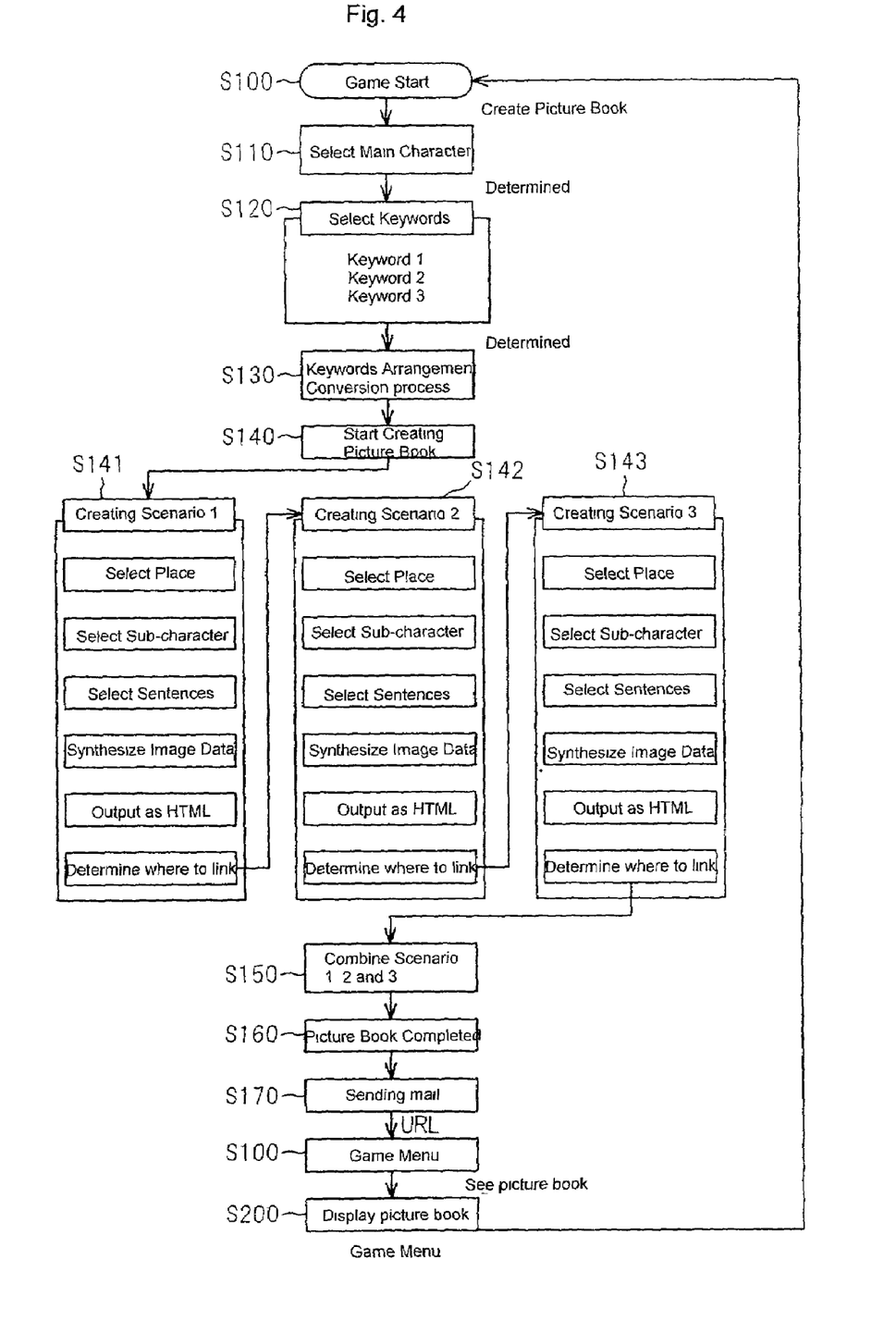
FIG. 4 is a flow chart showing a total flow of a picture book production system according to the preferred embodiment of the invention.
Figure 5:
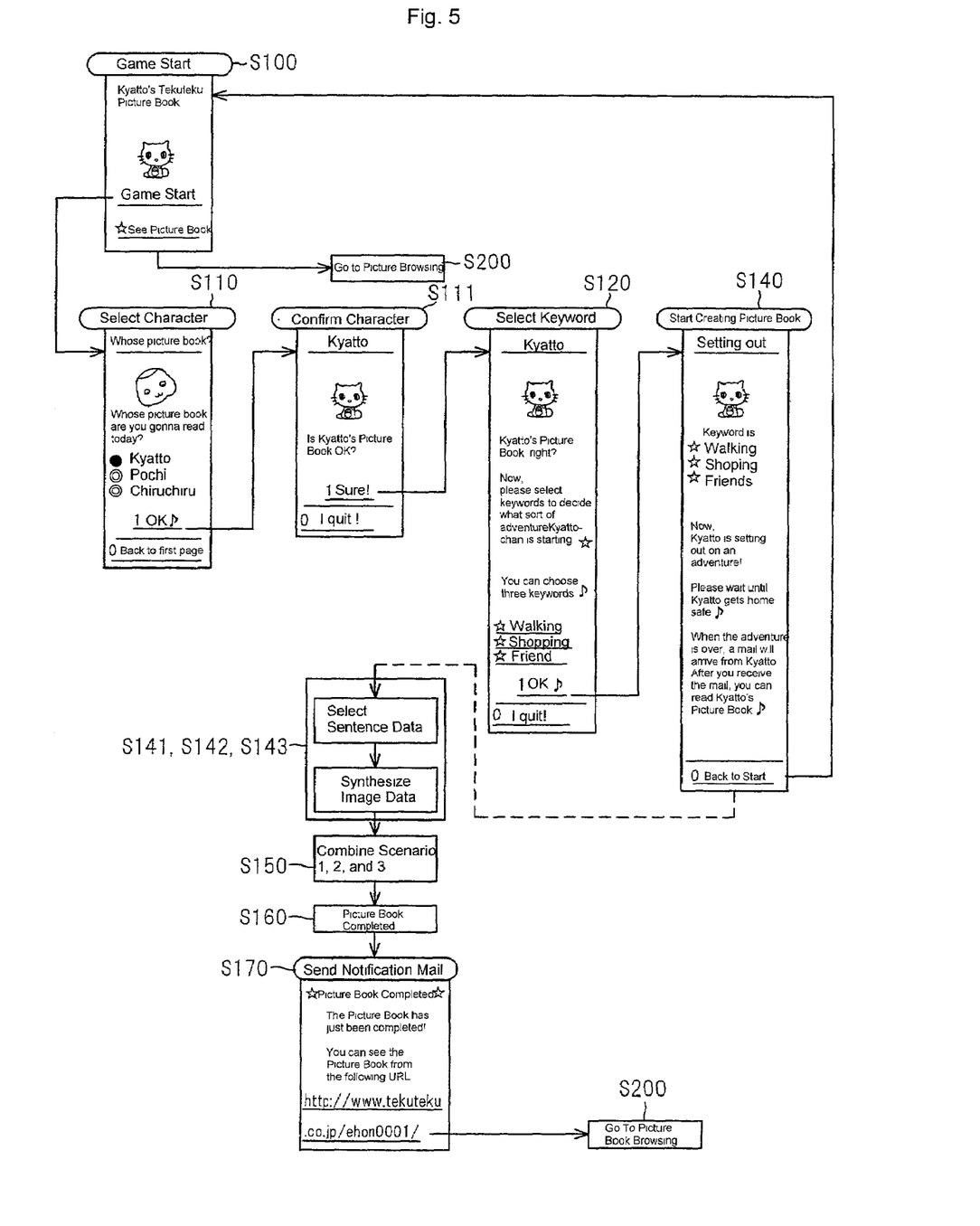
FIG. 5 is a flow chart showing a flow in a picture book creating mode of a picture book production system according to the preferred embodiment of the invention.

FIG. 4 shows a total flow whereas FIG. 5 shows a picture book production mode. First, a user selects a picture book production mode by operating the mobile phone 40. In other words, by operating the input unit 45 of the mobile phone 40, the user connects to the server 10 via the wireless base station 30 and the network 20. In this case, the CPU 11 of the server 10 conducts authentication of an individual in accordance with an ID or a password to be input by the user. The CPU 11 of the server 10 displays "Game Menu Screen" on the display unit 44, in accordance with a browsing software stored in the memory 12 (S100), as shown in FIG. 5. When the user operates the input unit 45 to select "Game Start Heading" of the "Game Menu Screen," "Select Character Screen" appears on the display unit 44. The user selects a main character as a leading part of the picture book from a plurality of characters shown on the "Select Character Screen" (S110). In this case, "Kyatto" is selected as an example.

As the user selects "OK" on the "Select Character Screen," "Confirm Character Screen" is displayed on the display unit 44 (S111).

When the user selects "Sure!" on the "Confirm Character Screen," the CPU 41 of the mobile phone 40 transmits selected data on a main character to the server 10. The CPU 11 of the server 10 displays "Select Keywords Screen" on the display unit 44 of the mobile phone 40. The user selects three keywords showing the selected main character's desired behavior on the "Select Keywords Screen" (S120). In this case, "Shopping," "Walking" and "Friend" are selected as an example. If the user selects "OK♪" on the "Select Keywords Screen" after the three keywords are selected, the CPU 41 of the mobile phone 40 transmits selected data on the keywords to the server 10. The CPU 11 of the server 10 displays "Start Creating Picture Book Screen" on the display unit 44 of the mobile phone 40.

The CPU 11 of the server 10 produces a picture book in accordance with the selected data on the main character and the keywords from the mobile phone 40. First, the CPU 11 of the server 10 operates Keywords Arrangement Conversion Process the three keywords selected by the user (S130). For instance, the three selected keywords are rearranged randomly. In this case, the selected keywords "Walking," "Shopping" and "Friend" are rearranged in the order of "Shopping," "Friend" and "Walking."

Then, The CPU 11 of the server 10 starts production of the picture book (S140). That is to say, Scenario 1 is produced from the first keyword rearranged by the keywords arrangement conversion process (S141) Scenario 2 is produced from the second keyword (S142) and Scenario 3 is produced from the third keyword (S143). When the respective scenarios 1, 2 or 3 are produced, a single location for each of the scenarios 1, 2, and 3 is randomly selected from a plurality of locations belonging to each of the first, second, and third keywords.

Then, a single sub-character is selected or no sub-character is selected from plurality of sub-characters belonging to the each of the selected locations. In this case, for the first rearranged keyword "Shopping," a location "Piccolo Town" and no sub-character are selected. For the second keyword "Friend," a location "Pyuro Town" and a sub-character "Pochi" are selected. For the third keyword "Walking," a location "Tam-tam Glassland" and a sub-character "Bear-chan" are selected. Sentence data which are unambiguously determined by the main character, the keywords, the locations, the sub-characters and the encounter flags are read out from the memory 12, along with image data corresponding to the sentence data. The image data and the sentence data are synthesized and converted to a program language operating on a browsing software such as HTML (Hyper Text Markup Language), for instance, so as to determine which part to link between the scenarios 1, 2 and 3.

Next, the CPU 11 of the server 10 combines the respective scenarios 1, 2 and 3. When the respective scenarios 1, 2 and 3 are combined, connecting sentences are inserted between the scenarios 1 and 2 and between the scenarios 2 and 3, so as to make a story move on smoothly from the scenarios 1 to 2, then the scenarios 2 to 3.

Then, the CPU 11 allocates the story into each page which matches the size of a screen on the mobile phone 40, with a prologue scenario appended before the first page and an epilogue scenario appended after the last page (S150), thereby completing the picture book (S160). The prologue scenario is produced by reading out the sentence data and image data concerning the scenario 1 from the memory 12 and by synthesizing both, and the epilogue scenario is produced by reading out the sentence data and image data concerning the scenario 3 from the memory 12 and by synthesizing both. The CPU 11 of the server 10 notifies the user by an E-mail that the picture book is completed in accordance with a communication software, and that the picture book can be browsed from a certain URL (address) (S170).

Figure 6:
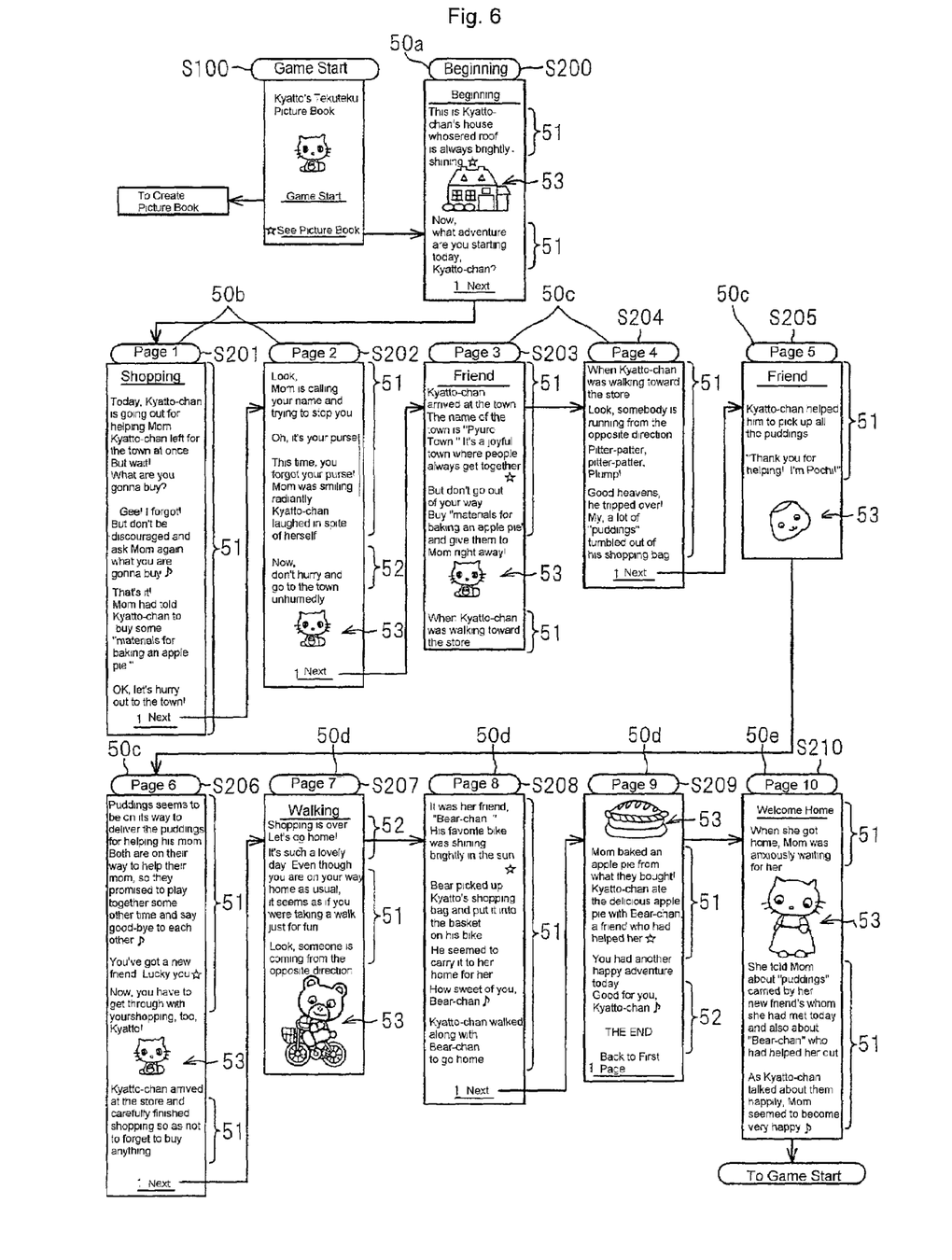
FIG. 6 is a flow chart showing a flow in a picture book browsing mode of a picture book production system according to the preferred embodiment of the invention.

FIG. 6 shows a picture book browsing mode. First, the user selects the picture book browsing mode by operating the mobile phone 40. In other words, by operating the input unit 45 of the mobile phone 40, the user connects to the server 10 via the wireless base station 30 and the network 20. In this case, the CPU 11 of the server 10 conducts authentication of an individual in accordance with an ID or a password to be input by the user. The CPU 11 of the server 10 displays "Game Menu Screen" on a display unit 44, in accordance with a browsing software stored in the memory 12. When the user selects "See Picture Book" heading of the "Game Menu Screen, an initial screen of the picture book appears on the display unit 44 (S200). Every time "Next" heading is selected, pages 1 to 10 are displayed successively on the display unit 44 (S201 to S210). Thus the user can see the picture book.

In FIG. 6, 50a indicates a prologue scenario, while 50b, 50c and 50d indicates scenarios 1, 2 and 3 , respectively, and 50e indicates an epilogue scenario. Furthermore, 51, 52 and 53 indicates sentence data, connecting sentences and images, respectively. Meanwhile, when "Back To First Page" heading is selected at step S209, pages 1 to 9 can be browsed once more (S201 to S209).

Figure 7A:
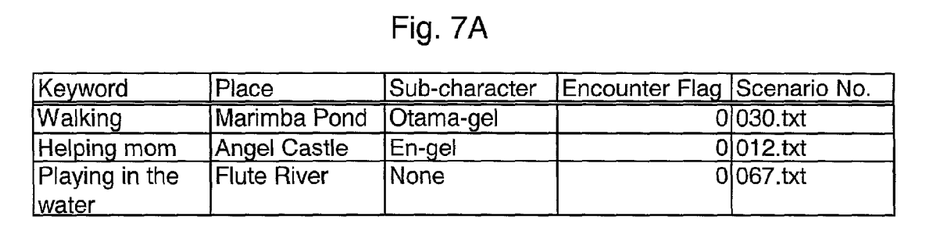
FIGS. 7A and 7B are charts illustrating a scenario produced by a picture book production system according to the preferred embodiment of the invention.
Figure 7B:
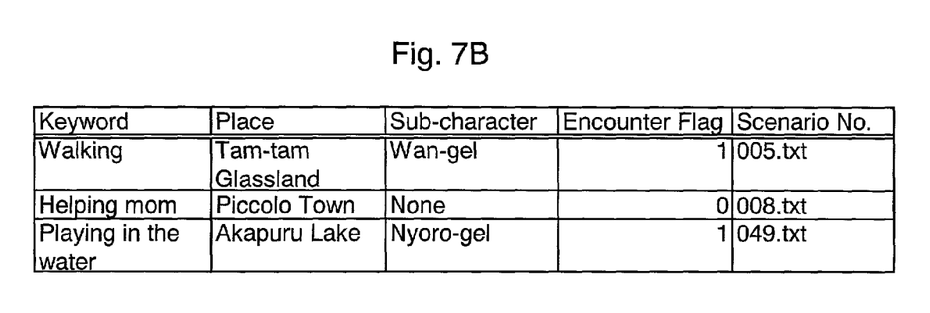

FIGS. 7A and 7B show an example of a produced scenario. According to the preferred embodiments of the invention, even though the same three keywords are selected, picture books with different scenarios are produced as shown in FIGS. 7A and 7B, since the keywords arrangement conversion process is conducted on the three selected keywords and the server 10 randomly selects another sentence data retrieval key for each keyword.

Further, even though the same sub-character appears on different locations, different scenarios are produced since encounter flags which are used as the sentence data retrieval key change.

Thirdly, since the picture book is produced by combining plurality of the sentence data and plurality of image data which are stored in the memory 12 of the server 10 beforehand, the user can save a lot of energy and stored amount of data can be suppressed.

Fourthly, since the image data are stored as corresponding to the sentence data in the memory 12 of the server 10, a picture book with sentences and pictures matching each other can be produced.

Meanwhile, in order not to produce the same scenario even when the user gets an access to the server for the second time or later and selects the same keywords, the server can retain each user's history data to select another sentence data. Producing the same picture book for the same user can be thus avoided.

Further, although a mobile phone is used as a terminal in the preferred embodiment according to the invention, a PHS (Personal Handy Phone System), a PDA (Personal Digital Assistant), a pocketboard (a kind of handy mobile terminal), or a personal computer can be used instead.

Also, although still pictures are used as images in the above preferred embodiment according to the invention, a picture book can be produced from a combination of still pictures and animations or simply from animations.

Thirdly, fixed map data are used in the preferred embodiment according to the invention, a picture book can incorporate map data which are retrieved in accordance with a sentence data retrieval key from plurality of map data stored in advance in the memory of the server.

Fourthly, a picture book can be produced by storing a plurality of sentence data and a plurality of image data in the memory of the server, by recognizing the present season and time by a time means provided in the server, and then by reading out plurality of sentence data and plurality of image data corresponding to the recognized present season and time. For instance, if a picture book is produced at 5 pm on July 7th, the picture book may be produced with images and sentences featuring a character in yukata (an informal cotton kimono for summer wear) playing under a bamboo tree hung with ornaments for Festival of the Weaver.

Fifthly, although the case where the terminal is connected via a network is explained in the above preferred embodiment according to the invention, the terminal can be connected via a communication interface instead of the network, or else the terminal can be connected in the form of a stand-alone equipment for producing a picture book, which serves both a terminal and a server function; or in the form of connecting a home-use video game equipment to a television set.

In the sixth place, if sound data or a combination of sound data and sentence data are stored instead of sentence data, a picture book with sound data together with image data, or with a combination of sentence data and sound data together with image data can be produced by using keywords as in the above preferred embodiments of the invention. In this case, a combination of sentences and images or simply images can appear on a display, with voices to be output from a loudspeaker.

According to the invention described above, a picture book is produced by combining plurality of image data and plurality of sentence data which are stored in a memory beforehand; therefore a user can save a lot of energy and the amount of data to be stored can be suppressed. Further, since image data are stored corresponding to sentence data, it is possible to create a picture book containing mutually consistent image data and sentence data.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A picture book production system comprising:
   a memory means for storing a plurality of sentence data associated with a behavior of a main character corresponding to a first plurality of keywords representing said behavior of said main character in a picture book, said memory means also storing a plurality of image data corresponding to said plurality of sentence data;

a selection means for selecting a second plurality of keywords from said first plurality of keywords, the second plurality of keywords being smaller or equal to in number to the first plurality of keywords;

a production means for reading out from said memory means said sentence data and said image data by using a sentence data retrieval key comprising said main character and said selected second plurality of keywords, and synthesizing said read-out sentence data and said read-out image data to produce a plurality of picture book constituent parts;

a connecting sentence producing means for selecting a connecting sentence to be inserted between said picture book constituent parts, said connecting sentence comprising a blank, and then inserting a word associated with said sentence data retrieval key into said blank to modify said connecting sentence; and a scenario combining means for combining said plurality of picture book constituent parts while inserting said modified connecting sentence between said picture book constituent parts to produce said picture book.

2. The picture book production system according to claim 1, wherein:
said plurality of image data includes animations.

3. The picture book production system according to claim 1, wherein:
said memory means stores said plurality of sentence data and said plurality of image data in accordance with seasons; and
said production means recognizes a present season by a time means, reads out from said memory means said sentence data and said image data corresponding to said present season, and produces said picture book.

4. A picture book production system comprising:
a memory means for storing a plurality of sentence data associated with a behavior of a main character corresponding to a plurality of keywords representing said behavior of said main character in a picture book, said memory means also storing a plurality of image data corresponding to said plurality of sentence data;
a selection means for selecting, in a particular order, multiple keywords from said plurality of keywords;
a production means for rearranging the order of said selected multiple keywords, reading out from said memory means said plurality of sentence data and said plurality of image data by using a sentence data retrieval key comprising said main character and said selected multiple keywords, synthesizing said read-out plurality of sentence data and said read-out plurality of image data to produce a plurality of picture book constituent parts;
a connecting sentence producing means for selecting a connecting sentence to be inserted between said picture book constituent parts, said connecting sentence comprising a blank, and then inserting a word associated with said sentence data retrieval key into said blank to modify said connecting sentence; and
a scenario combining means for combining said plurality of picture book constituent parts in said rearranged order of the multiple keywords while inserting said modified connecting sentence between said picture book constituent parts to produce said picture book.

5. The picture book production system according to claim 4, wherein:
said multiple keywords are rearranged in a random order.

6. The picture book production system according to claim 4, wherein:
said plurality of image data includes animations.

7. The picture book production system according to claim 4, wherein:
said memory means stores said plurality of sentence data and said plurality of image data in accordance with seasons; and
said production means recognizes a present season by a time means, reads out from said memory means said plurality of sentence data and said plurality of image data corresponding to said present season, and produces said picture book.

8. A picture book production system comprising:
a memory means for storing a plurality of sentence data associated with a behavior of a plurality of main characters in a picture book and corresponding to a plurality of keywords representing said behavior of said main characters, said memory means also storing a plurality of image data corresponding to said plurality of sentence data;
a selection means for selecting one main character and multiple keywords from said plurality of main characters and said plurality of keywords, the multiple keywords being selected in a particular order;
a production means for rearranging the order of said selected multiple keywords, reading out from said memory means said plurality of sentence data and said plurality of image data by using a sentence data retrieval key comprising said one selected main character and said selected multiple keywords, synthesizing said read-out plurality of sentence data and said read-out plurality of image data to produce a plurality of picture book constituent parts;
a connecting sentence producing means for selecting a connecting sentence to be inserted between said picture book constituent parts, said connecting sentence comprising a blank, and then inserting a word associated with said sentence data retrieval key into said blank to modify said connecting sentence; and
a scenario combining means for combining said plurality of picture book constituent parts in said rearranged order of the multiple keywords while inserting said modified connecting sentence between said picture book constituent parts to produce said picture book.

9. A picture book production system comprising:
a memory means for storing a plurality of locations for movement of a main character and a plurality of sub-characters appearing therein corresponding to a plurality of keywords representing a behavior of said main character in a picture book, said memory means also storing a plurality of sentence data, associated with said behavior, corresponding to said keywords, said locations, and said sub-characters, said memory means also storing a plurality of image data corresponding to said plurality of sentence data;
a selection means for selecting a keyword from said plurality of keywords;
a production means for determining said locations and said sub-characters on the basis of said selected keyword, reading out from said memory means said sentence data and said image data by using a sentence data retrieval key comprising said selected keyword, said determined locations and said determined sub-characters, and synthesizing said read-out sentence data and said read-out image data to produce a plurality of picture book constituent parts;

a connecting sentence producing means for selecting a connecting sentence to be inserted between said picture book constituent parts, said connecting sentence comprising a blank, and then inserting a word associated with said sentence data retrieval key into said blank to modify said connecting sentence; and a scenario combining means for combining said plurality of picture book constituent parts while inserting said modified connecting sentence between said picture book constituent parts to produce said picture book.

10. A picture book production system comprising:

a memory means for storing a plurality of sentence data associated with a behavior of a main character corresponding to a plurality of keywords representing said behavior of said main character in a picture book, said memory means also storing a plurality of image data corresponding to said plurality of sentence data;

a selection means for selecting multiple keywords from said plurality of keywords;

a production means for reading out from said memory means said sentence data and said image data by using a sentence data retrieval key comprising said main character and said selected multiple keywords, and synthesizing said read-out sentence data and said read-out image data to produce a plurality of picture book constituent parts;

a connecting sentence producing means for selecting a connecting sentence to be inserted between said picture book constituent parts, said connecting sentence comprising a blank, and then inserting a word associated with said sentence data retrieval key into said blank to modify said connecting sentence;

a scenario combining means for combining said plurality of picture book constituent parts while inserting said modified connecting sentence between said picture book constituent parts to produce said picture book; and a display means for displaying said picture book.

11. A server for producing a picture book in accordance with information from a terminal connected via a network, said server comprising:

a memory means for storing a plurality of sentence data associated with a behavior of a main character corresponding to a plurality of keywords representing said behavior of said main character in said picture book, said memory means also storing a plurality of image data corresponding to said plurality of sentence data;

a production means for reading out from said memory means said sentence data and said image data by using a sentence data retrieval key comprising said main character and multiple keywords selected from said plurality of keywords by said terminal, and synthesizing said read-out sentence data and said read-out image data to produce plurality of picture book constituent parts;

a connecting sentence producing means for selecting a connecting sentence to be inserted between said picture book constituent parts, said connecting sentence comprising a blank, and then inserting a word associated with said sentence data retrieval key into said blank to modify said connecting sentence; and a scenario combining means for combining said plurality of picture book constituent parts while inserting said modified connecting sentence between said picture book constituent parts to produce said picture book.

12. The server for producing a picture book according to claim 11, wherein:

said production means enables said picture book to be read for said terminal in accordance with a request from said terminal.

13. The server for producing a picture book according to claim 11, wherein:

said terminal comprises a mobile phone, PHS, PDA, pocketboard, or PC.

14. A recording medium for recording comprising:

a plurality of sentence data corresponding to a first plurality of keywords representing a behavior of a main character in a picture book;

a plurality of image data corresponding to said plurality of sentence data; and a computer operating program for (1) reading out, from said plurality of sentence data and from said plurality of image data, said sentence data and said image data by using a sentence data retrieval key comprising said main character and a second plurality of keywords selected from said first plurality of keywords, (2) synthesizing said read-out sentence data and said read-out image data to produce a plurality of picture book constituent parts, (3) selecting a connecting sentence to be inserted between said picture book constituent parts, said connecting sentence comprising a blank, and then inserting a word associated with said sentence data retrieval key into said blank to modify said connecting sentence, and then inserting said modified connecting sentence between said picture book constituent parts, and (4) combining said plurality of picture book constituent parts while inserting said modified connecting sentence between said picture book constituent parts to produce said picture book.

* * * * *